US012772215B2

(12) United States Patent
Dong

(10) Patent No.: US 12,772,215 B2
(45) Date of Patent: Oct. 20, 2026

(54) METHOD AND APPARATUS FOR DETERMINING VALUE OF DURATION FIELD

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 777 days.

(21) Appl. No.: 18/008,320

(22) PCT Filed: Jun. 5, 2020

(86) PCT No.: PCT/CN2020/094650
§ 371 (c)(1),
(2) Date: Dec. 5, 2022

(87) PCT Pub. No.: WO2021/243699
PCT Pub. Date: Dec. 9, 2021

(65) Prior Publication Data
US 2023/0209513 A1 Jun. 29, 2023

(51) Int. Cl.
*H04W 72/0446* (2023.01)
*H04L 1/1607* (2023.01)

(52) U.S. Cl.
CPC ....... *H04W 72/0446* (2013.01); *H04L 1/1614* (2013.01)

(58) Field of Classification Search
CPC ............. H04W 72/0446; H04L 1/1678; H04L 1/1614; H04L 1/1685
See application file for complete search history.

(56) References Cited

U.S. PATENT DOCUMENTS 9,031,054 B2 * 5/2015 Marin ................. H04W 74/006 370/348
10,051,566 B2 * 8/2018 Yang ................. H04W 52/0209
(Continued)

FOREIGN PATENT DOCUMENTS

CN 101006673 A 7/2007
CN 103178943 A 6/2013
(Continued)

OTHER PUBLICATIONS

India Office Action issued on Feb. 1, 2023 for Indian Patent Application No. 202247074340.
(Continued)

*Primary Examiner* — Marcus Smith
(74) *Attorney, Agent, or Firm* — Volpe Koenig

(57) ABSTRACT

A method, apparatus and non-transitory computer readable storage medium for determining the value of a duration field. The duration of the duration field is determined by a method that includes: receiving a first frame transmitted by a target device in a first connection; and generating an acknowledgement message frame corresponding to the first frame and to be transmitted in a second connection, where in response to the first frame including one frame, a value of a duration field in the acknowledgement message frame corresponding to the first frame is determined according to states of respective frames to be transmitted in the first connection and the second connection.

11 Claims, 3 Drawing Sheets

(56) References Cited

U.S. PATENT DOCUMENTS

| | | | | |
|---|---|---|---|---|
| 10,244,522 | B2 | 3/2019 | Li et al. | |
| 10,523,407 | B2 * | 12/2019 | Nabetani | H04L 5/0053 |
| 10,652,325 | B2 * | 5/2020 | Yang | H04W 68/005 |
| 10,750,489 | B2 | 8/2020 | Li et al. | |
| 10,823,829 | B2 * | 11/2020 | Kneckt | G01S 13/765 |
| 2013/0301569 | A1 * | 11/2013 | Wang | H04L 5/0055 370/329 |
| 2015/0063251 | A1 * | 3/2015 | Asterjadhi | H04W 74/04 370/329 |
| 2016/0309469 | A1 | 10/2016 | Shu et al. | |
| 2016/0330788 | A1 * | 11/2016 | Zheng | H04W 28/0205 |
| 2016/0380727 | A1 * | 12/2016 | Ryu | H04L 1/18 370/245 |
| 2017/0195142 | A1 * | 7/2017 | Sanderovich | H04B 7/0617 |
| 2018/0098303 | A1 * | 4/2018 | Zhang | H04W 52/0209 |
| 2018/0255532 | A1 | 9/2018 | Li et al. | |
| 2019/0124634 | A1 | 4/2019 | Li et al. | |
| 2020/0119885 | A1 | 4/2020 | Wolberg et al. | |
| 2020/0128524 | A1 | 4/2020 | Han et al. | |
| 2021/0211375 | A1 * | 7/2021 | Kwon | H04W 72/535 |
| 2021/0212118 | A1 * | 7/2021 | Lu | H04W 74/0816 |
| 2021/0289575 | A1 * | 9/2021 | Cherian | H04W 74/0808 |
| 2022/0150030 | A1 * | 5/2022 | Li | H04W 72/20 |
| 2023/0199882 | A1 * | 6/2023 | Tomeba | H04W 84/12 370/328 |
| 2026/0040348 | A1 * | 2/2026 | Yang | H04W 74/04 |

FOREIGN PATENT DOCUMENTS

| | | | |
|---|---|---|---|
| CN | 104321995 | A | 1/2015 |
| CN | 104904136 | A | 9/2015 |
| CN | 106131896 | A | 11/2016 |
| CN | 106131964 | A | 11/2016 |
| CN | 107079399 | A | 8/2017 |
| CN | 107645788 | A | 1/2018 |
| CN | 108574554 | A | 9/2018 |
| CN | 109041179 | A | 12/2018 |
| CN | 109121206 | A | 1/2019 |
| CN | 110419192 | A | 11/2019 |
| EP | 3348106 | A1 | 7/2018 |
| WO | 2017/044814 | A1 | 3/2017 |

OTHER PUBLICATIONS

ISA State Intellectual Property Office of the People's Republic of China, Written Opinion of the International Searching Authority Issued on Feb. 24, 2021 for Chinese Patent Application No. PCT/CN2020/094650.

ISA State Intellectual Property Office of the People's Republic of China, International Search Report Issued in Application No. PCT/CN2020/094650, Feb. 24, 2021, WIPO, 4 pages.

European Patent Office, Extended European Search Report Issued in Application No. 20939441.0, Feb. 7, 2024, Germany, 11 pages.

State Intellectual Property Office of the People's Republic of China, Office Action and Search Report Issued in Application No. 2020800011391, Jan. 15, 2024, 11 pages.

Ren Zhi et al., "Method of adaptive multi-frame efficient transmission based on LoRaWAN", Application Research of Computers, vol. 37 No. 5, May 2020, 5 pages.

* cited by examiner

METHOD AND APPARATUS FOR DETERMINING VALUE OF DURATION FIELD

CROSS REFERENCE TO RELATED APPLICATIONS

This application is the national phase of International Application No. PCT/CN2020/094650 filed on Jun. 5, 2020, the disclosure of which is hereby incorporated by reference in its entirety.

TECHNICAL FIELD

The present disclosure relates to the field of communication technologies, and in particular to a method for determining a value of a duration field, an apparatus for determining a value of a duration field, an electronic device, and a computer readable storage medium.

BACKGROUND

In a process of communication between a station (STA) and an access point (AP), a transmitter can transmit a frame to a receiver through one connection therebetween, and the receiver can feed back an acknowledgement (ACK) message frame to the transmitter. The status (for example, received, or not received) of receiving the frame by the receiver can be fed back to the transmitter through the ACK message frame.

The ACK message frame can include a media access control (MAC) frame header and a frame check sequence (FCS), where the MAC frame header can include a duration field, and a value of the duration field can indicate a length of time during which it is necessary for the receiver to occupy the above connection.

With the development of communication technologies, the STA and the AP are not limited to communicating through one connection, but can communicate simultaneously through a plurality of connections. Thus, it is difficult to adapt to this scenario through the present method for determining the value of the duration field.

SUMMARY

In view of this, embodiments of the present disclosure provide a method for determining a value of a duration field, an apparatus for determining a value of a duration field, an electronic device, and a computer readable storage medium to solve technical problems in the related art.

According to a first aspect of the embodiments of the present disclosure, there is provided a method for determining a value of a duration field, including:

- receiving a first frame transmitted by a target device in a first connection; and
- generating an acknowledgement message frame corresponding to the first frame and to be transmitted in a second connection, where in response to the first frame including one frame, a value of a duration field in the acknowledgement message frame corresponding to the first frame is determined according to states of respective frames to be transmitted in the first connection and the second connection.

According to a second aspect of the embodiments of the present disclosure, there is provided an electronic device, including:

- a processor; and
- a memory for storing instructions executable by the processor,
- where the processor is configured to implement the method described in any one of the above embodiments.

According to the third aspect of the embodiment of the present disclosure, a computer readable storage medium storing a computer program, where the computer program, when executed by a processor, causing the processor to implement the steps of the method described in any one of the above embodiments.

BRIEF DESCRIPTION OF THE DRAWINGS

In order to explain the technical solutions more clearly in the embodiments of the present disclosure, the drawings required for the description of the embodiments will be briefly introduced below. The drawings in the following description are only some embodiments of the present disclosure. For those of ordinary skill in the art, other drawings can also be obtained based on these drawings, without paying any creative labor.

DETAILED DESCRIPTION OF THE EMBODIMENTS

The technical solutions in the embodiments of the present disclosure will be described clearly and completely below in combination with the drawings in the embodiments of the present disclosure. Obviously, the described embodiments are only part of the embodiments of the present disclosure, not all of them. Based on the embodiments in the disclosure, all other embodiments obtained by ordinary technicians in the art without doing creative work belong to the scope of the disclosure.

Figure 1:
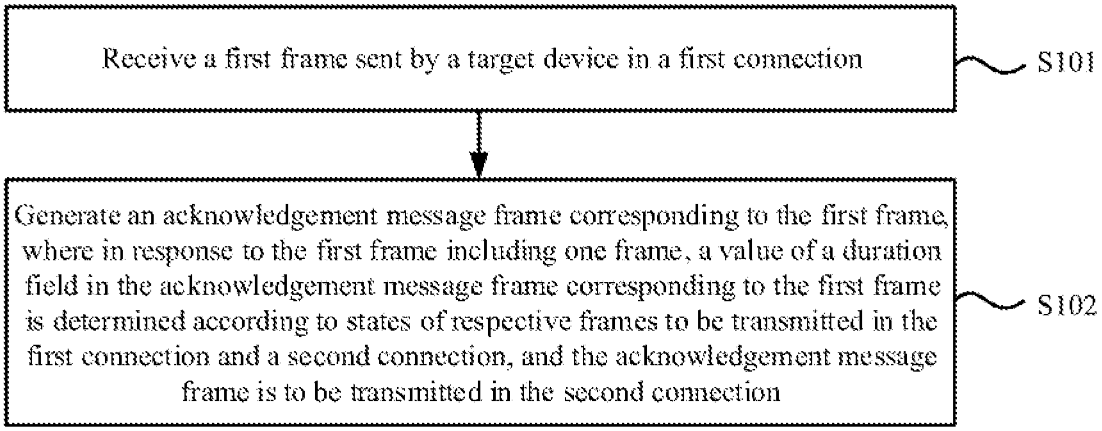
FIG. 1 is a schematic flowchart illustrating a method for determining a value of a duration field according to an embodiment of the present disclosure.

FIG. 1 is a schematic flowchart illustrating a method for determining a value of a duration field according to an embodiment of the present disclosure. The method shown in this embodiment can be applied to a terminal including, but not limited to, an electronic device such as a mobile telephone, a tablet computer, a wearable device, a personal computer, an industrial sensor, and an Internet of Things (IoT) device. The terminal can be used as a station (STA) or an access point (AP).

As shown in FIG. 1, the method for determining the value of the duration field can include the following steps.

In step S101, a first frame transmitted by a target device is received in a first connection.

In step S102, an acknowledgement message frame corresponding to the first frame is generated, where in response to the first frame including one frame, a value of a duration field in the acknowledgement message frame corresponding to the first frame is determined according to states of respective frames to be transmitted in the first connection and a second connection, and the acknowledgement message frame is to be transmitted in the second connection.

In some embodiments, the respective frames to be transmitted can include frames to be transmitted from the target device to the terminal, or from the terminal to the target device.

It should be noted that the frame to be transmitted can be a new frame, or a frame required to be transmitted again because of unsuccessful transmission, namely, a retransmitted frame.

In all embodiments of the present disclosure, the frame to be transmitted can be a frame carrying data, a frame carrying signaling and/or a reference signal, or a frame carrying any form of content, which is not limited to the embodiments of the present disclosure.

In one embodiment, the target device and the terminal can communicate simultaneously through a plurality of connections, where each of the plurality of connections can correspond to a different frequency band, for example, a frequency band of 2.4 GHz, a frequency band of 5.8 GHz, and a frequency band of 6-7 GHz; and can also correspond to a different bandwidth part in the above three frequency bands.

The target device can transmit the first frame to the terminal in the first connection. The first frame can be a frame for carrying a Quality of Service (QoS), and the terminal can feed back the acknowledgement message frame corresponding to the first frame to the target device in the second connection.

In this case, the target device and the terminal do not communicate through one connection, but communicate through a plurality of connections. Therefore, the state of the frame to be transmitted in each of the plurality of connections may be different.

For example, for the first connection and the second connection, there may be no frame to be transmitted in both the first connection and the second connection, or there may be one or more frames to be transmitted in one of the first connection and the second connection, or there may be one or more frames to be transmitted in both the first connection and the second connection.

However, for the first frame received in the first connection, the terminal only feeds back one acknowledgement message frame to the target device in the second connection, and thus, it is necessary to use the value of the duration field in the acknowledgement message frame to indicate the length of time during which the first connection and/or the second connection is occupied. In some embodiments, the length of time during which the first connection and/or the second connection is occupied is a length of time during which the first connection and/or the second connection is occupied after the acknowledgement message frame is fed back by the terminal to the target device.

Specifically, in the embodiment of the present disclosure, the value of the duration field in the acknowledgement message frame corresponding to the first frame can be determined according to the states of the respective frames to be transmitted in the first connection and the second connection. That is, it is necessary to consider not only whether there is the frame to be transmitted in the first connection for receiving the first frame, but also whether there is the frame to be transmitted in the second connection for transmitting the acknowledgement message frame, instead of only considering whether there is the frame to be transmitted in one of the two connections. Therefore, it is possible to comprehensively and accurately determine the length of time during which the first connection and/or the second connection is occupied after the acknowledgement message frame is fed back to the target device, and then accurately determine the value of the duration field used to indicate the length of time in the acknowledgement message frame.

It should be noted that besides the duration field, the acknowledgement message frame can also include other fields, and values of the other fields can also be determined according to the states of the respective frames to be transmitted in the first connection and the second connection.

Figure 2:
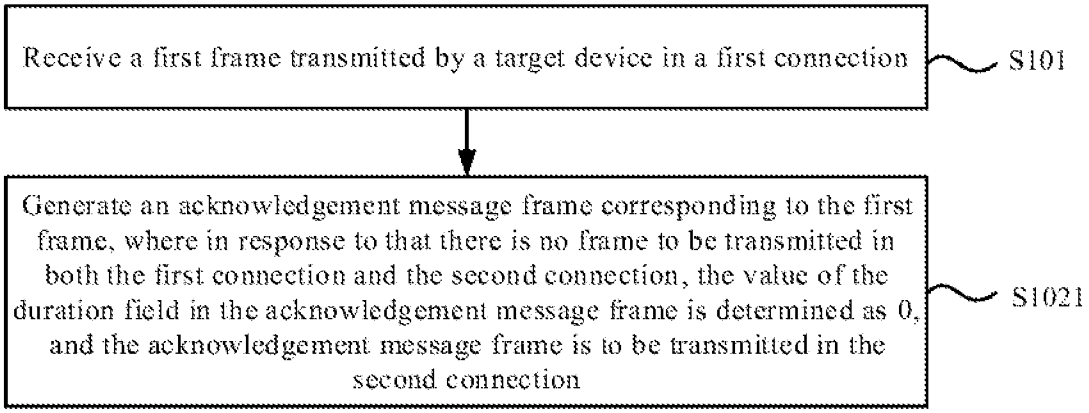
FIG. 2 is a schematic flowchart illustrating another method for determining a value of a duration field according to an embodiment of the present disclosure.

FIG. 2 is a schematic flowchart illustrating another method for determining a value of a duration field according to an embodiment of the present disclosure. As shown in FIG. 2, the value of the duration field in the acknowledgement message frame corresponding to the first frame is determined according to the states of the respective frames to be transmitted in the first connection and the second connection. The embodiment shown in FIG. 2 can be implemented together with the embodiment shown in FIG. 1, or implemented separately. The method includes the following steps.

In step S1021, in response to that there is no frame to be transmitted in both the first connection and the second connection, the value of the duration field in the acknowledgement message frame is determined as 0.

In one embodiment, when there is no frame to be transmitted in both the first connection and the second connection, the terminal does not need to occupy the first connection and/or the second connection to continuously communicate with the target device. Therefore, it can be determined that the value of the duration field in the acknowledgement message frame is 0. That is, after the acknowledgement message frame is fed back to the target device, it is not necessary for the terminal to continuously occupy the first connection and/or the second connection.

Figure 3:
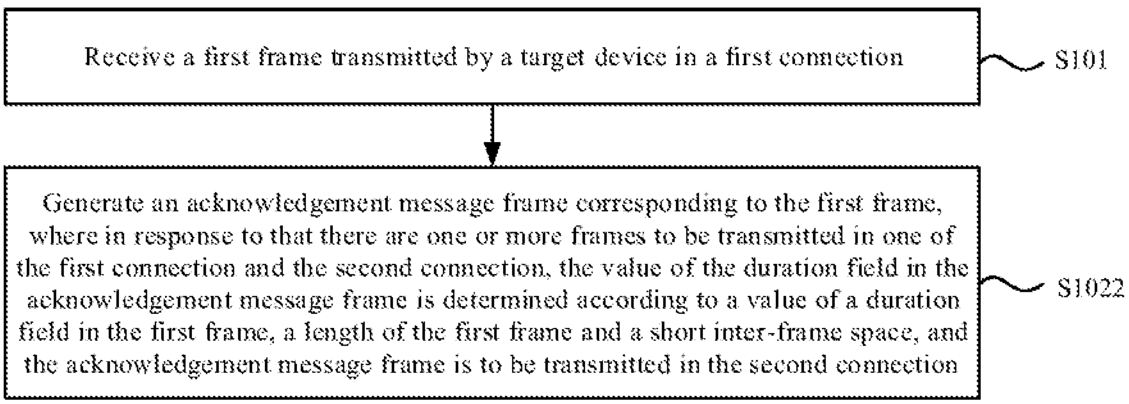
FIG. 3 is a schematic flowchart illustrating yet another method for determining a value of a duration field according to an embodiment of the present disclosure.

FIG. 3 is a schematic flowchart illustrating yet another method for determining a value of a duration field according to an embodiment of the present disclosure. As shown in FIG. 3, the value of the duration field in the acknowledgement message frame corresponding to the first frame is determined according to the states of the respective frames to be transmitted in the first connection and the second connection. The embodiment is shown in FIG. 3 can be implemented together with any one of the embodiments shown in FIG. 1 and FIG. 2, or implemented separately. The method includes the following steps.

In step S1022, in response to that there are one or more frames to be transmitted in one of the first connection and the second connection, the value of the duration field in the acknowledgement message frame is determined according to a value of a duration field in the first frame, a length of the first frame and a short inter-frame space.

It should be noted that the length of the frame described in this embodiment and subsequent embodiments refers to a length in the time domain. Specifically, the length of the frame can indicate the length of time.

In one embodiment, there is also a duration field in the first frame transmitted by the target device in the first connection to the terminal, and a value of the duration field in the first frame is used to indicate a length of time during that the terminal must occupy the first connection and/or the second connection. The length of time can include the length of the first frame, the short inter-frame space (SIFS) and a length of the respective frames to be transmitted in the first connection and/or the second connection.

However, after the acknowledgement message frame is fed back to the target device, it is necessary for the terminal to continuously occupy the first connection and/or the second connection to continuously communicate with the target device, so as to receive the frame transmitted by the target device, or transmit the frame to the target device. Therefore, after the acknowledgement message frame is fed back to the target device, a length of time during which it is necessary for the terminal to continuously occupy the first connection and/or the second connection is equal to a length of the respective frames to be transmitted in the first connection and/or the second connection. Therefore, the value of the duration field in the acknowledgement message frame can be determined according to the value D1 of the duration field in the first frame, the length L1 of the first frame and the short inter-frame space SIFS.

Specifically, the value of the duration field in the acknowledgement message frame is equal to D1−L1−SIFS. For example, D1=100 us, L1=10 us, SIFS=16 us, and the value of the duration field in the acknowledgement message frame is equal to 100 us−10 us−16 us=74 us.

Figure 4:
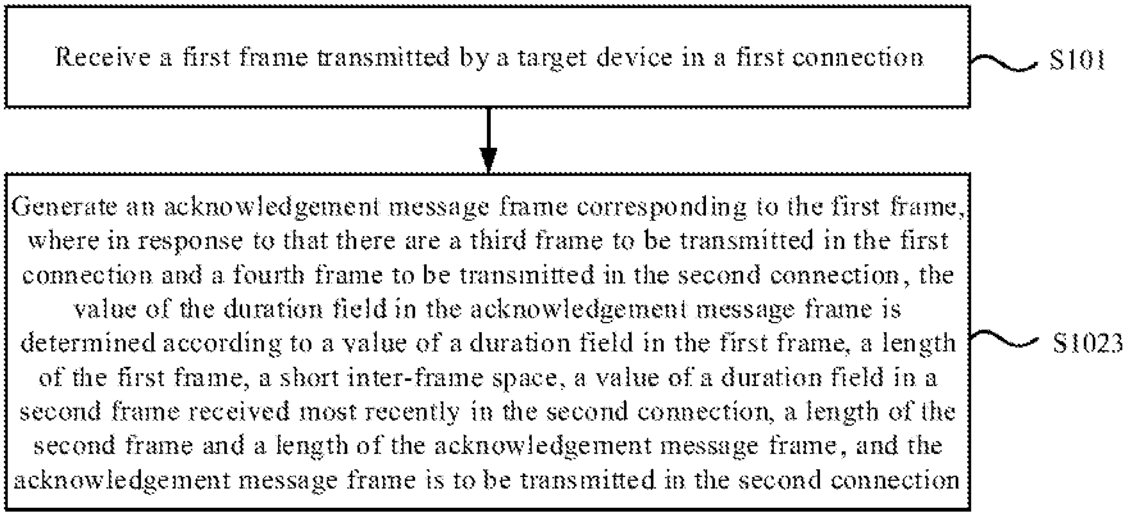
FIG. 4 is a schematic flowchart illustrating yet another method for determining a value of a duration field according to an embodiment of the present disclosure.

FIG. 4 is a schematic flowchart illustrating a method for determining a value of a duration field according to an embodiment of the present disclosure. As shown in FIG. 4, the value of the duration field in the acknowledgement message frame corresponding to the first frame is determined according to the states of the respective frames to be transmitted in the first connection and the second connection. The embodiment shown in FIG. 4 can be implemented together with any one of the embodiments shown in FIG. 1, FIG. 2, and FIG. 3, or implemented separately, which is not limited to the embodiments of the present disclosure. In some embodiments, as shown in FIG. 4, the method includes the following steps.

In step S1023, in response to that there are a third frame to be transmitted in the first connection and a fourth frame to be transmitted in the second connection, the value of the duration field in the acknowledgement message frame is determined according to a value of a duration field in the first frame, a length of the first frame, a short inter-frame space, a value of a duration field in a second frame received most recently in the second connection, a length of the second frame and a length of the acknowledgement message frame.

In one embodiment, when there are the third frame to be transmitted in the first connection and the fourth frame to be transmitted in the second connection, after the acknowledgement message frame is fed back to the target device, the terminal must occupy the first connection and/or the second connection to continuously communicate with the target device, so as to receive or transmit the third frame in the first connection and receive or transmit the fourth frame in the second connection.

However, when the acknowledgement message frame is fed back to the target device in the second connection, both the third frame to be transmitted and the fourth frame to be transmitted can be transmitted by the terminal in the second connection. Therefore, after the acknowledgement message frame is fed back to the target device, a length of time during which it is necessary for the terminal to continuously occupy the first connection and/or the second connection is equal to the length of the third frame plus the length of the fourth frame.

In one embodiment, there is also a duration field in the first frame transmitted by the target device in the first connection to the terminal, and a value of the duration field in the first frame is used to indicate a length of time during which the terminal must occupy the first connection. The length of time during which the terminal must occupy the first connection can include the length of the first frame, the short inter-frame space, and a length of the third frame to be transmitted in the first connection.

Therefore, the length L3 of the third frame can be determined according to the value D1 of the duration field in the first frame, the length L1 of the first frame and the short inter-frame space SIFS, where L3 is equal to D1−L1−SIFS.

Correspondingly, there is also a duration field in the second frame transmitted most recently by the target device in the second connection to the terminal, and a value of the duration field in the second frame is used to indicate a length of time during which the terminal must occupy the second connection. The terminal must feed back the acknowledgement message frame to the target device in the second connection. Therefore, the length of time during which the terminal must occupy the second connection can include the length of the second frame, the short inter-frame space, a length of the fourth frame to be transmitted in the second connection and the length of the acknowledgement message frame.

Therefore, the length L4 of the fourth frame can be determined according to the value D2 of the duration field in the second frame, the length L2 of the second frame, the short inter-frame space SIFS and the length ACK of the acknowledgement message frame, where L4 is equal to D2−L2−SIFS-ACK.

After the acknowledgement message frame is fed back to the target device, the length of time during which it is necessary for the terminal to continuously occupy the first connection and/or the second connection is equal to the length of the third frame plus the length of the fourth frame, namely, L3+L4; that is, D1−L1−SIFS+D2−L2−SIFS−ACK=D1+D2−L1−L2−2SIFS−ACK. For example, D1=53 us, D2=47 us, L1=8 us, L2=12 us, ACK=8 us and SIFS=16 us, and the value of the duration field in the acknowledgement message frame is equal to 53 us+47 us−8 us−12 us−2*16 us−8 us=40 us.

In some examples, the acknowledgement message frame further includes one or more preset bits configured to identify the states of the respective frames to be transmitted in the first connection and the second connection.

In one embodiment, the preset bits can also be set in the acknowledgement message frame transmitted by the terminal to the target device, and the states of the respective frames to be transmitted in the first connection and the second connection can be identified through the preset bits. For example, the states of the respective frames to be transmitted in the first connection and the second connection can include four types: there is no frame to be transmitted in both the first connection and the second connection; there are one or more frames to be transmitted in one of the first connection and the second connection; there is a third frame to be transmitted in the first connection and a fourth frame to be transmitted in the second connection, and the third frame and the fourth frame are transmitted in the first connection; there is a third frame to be transmitted in the first connection and a fourth frame to be transmitted in the second connection, and the third frame and the fourth frame are transmitted in the second connection. Therefore, the four states can be identified by 2 bits.

Accordingly, after receiving the acknowledgement message frame, the target device can determine the states of the respective frames to be transmitted in the first connection and the second connection according to the preset bits in the acknowledgement message frame, and then determine how to receive the respective frames to be transmitted. For example, it is determined according to the preset bits that there is the third frame to be transmitted in the first connection, the fourth frame to be transmitted in the second connection, and the third frame and the fourth frame are transmitted in the second connection, and then the third frame and the fourth frame can be received in the second connection.

Figure 5:
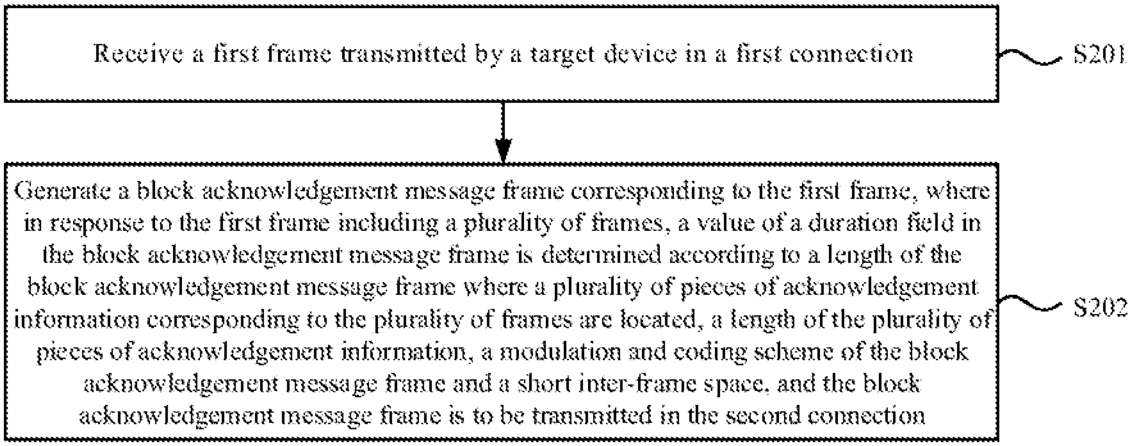
FIG. 5 is a schematic flowchart illustrating yet another method for determining a value of a duration field according to an embodiment of the present disclosure.

FIG. 5 is a schematic flowchart illustrating yet another method for determining a value of a duration field according to an embodiment of the present disclosure. As shown in FIG. 5, the method includes the following steps.

In step S201, a first frame transmitted by a target device is received in a first connection.

In step S202, a block acknowledgement message frame corresponding to the first frame is generated, where in response to the first frame including a plurality of frames, a value of a duration field in the block acknowledgement message frame is determined according to a length of the block acknowledgement message frame where a plurality of pieces of acknowledgement information corresponding to the plurality of frames are located, a length of the plurality of pieces of acknowledgement information, a modulation and coding scheme of the block acknowledgement message frame and a short inter-frame space, and the block acknowledgement message frame are to be transmitted in the second connection.

In some embodiments, the frame to be transmitted can be transmitted by the target device to the terminal, or transmitted by the terminal to the target device.

It should be noted that the frame to be transmitted can be a new frame, or a frame required to be transmitted again because of unsuccessful transmission, namely, a retransmitted frame.

In all embodiments of the present disclosure, the frame to be transmitted can be a frame carrying data, a frame carrying signaling and/or a reference signal, or a frame carrying any form of content, which is not limited to the embodiments of the present disclosure.

In one embodiment, the target device and the terminal can communicate simultaneously through a plurality of connections, where each of the plurality of connections can correspond to a different frequency band, for example, a frequency band of 2.4 GHz, a frequency band of 5.8 GHz, and a frequency band of 6-7 GHz; and can also correspond to a different bandwidth part in the above three frequency bands.

The target device can transmit the first frame to the terminal in the first connection. The first frame can be a frame for carrying a QoS, and the terminal can feed back the acknowledgement message frame corresponding to the first frame to the target device in the second connection.

In this case, the target device and the terminal do not communicate through one connection, but through a plurality of connections. Therefore, the state of the frame to be transmitted in each of the plurality of connections may be different.

For example, for the first connection and the second connection, there may be no frame to be transmitted in both the first connection and the second connection, or there may be one or more frames to be transmitted in one of the first connection and the second connection, or there may be one or more frames to be transmitted in both the first connection and the second connection.

However, for the first frame received in the first connection, the terminal only feeds back one acknowledgement message frame to the target device in the second connection, and thus, it is necessary to use the value of the duration field in the acknowledgement message frame to indicate the length of time during which the first connection and/or the second connection is occupied. In some embodiments, the length of time during which the first connection and/or the second connection is occupied is a length of time during which the first connection and/or the second connection is occupied after the acknowledgement message frame is fed back by the terminal to the target device.

The target device can transmit the first frame to the terminal in the first connection, and the first frame can include a plurality of frames. For the status of receiving the plurality of frames, the terminal can generate a plurality of pieces of acknowledgement information, and form a block acknowledgement (Block ACK) message frame with the plurality of pieces of acknowledgement information.

For the plurality of pieces of acknowledgement information, modulation and coding must be performed according to a modulation and coding scheme (MCS) corresponding to the Block ACK message frame. The time taken for performing modulation and coding through different MCSs is different. For example, a modulation and coding speed corresponding to the MCS is v, a length of the plurality of pieces of acknowledgement information is L0, and a length of time for performing modulation and coding on the plurality of pieces of acknowledgement information is L0/v.

The terminal receives a plurality of frames transmitted by the target device in the first connection, and transmits the Block ACK message frame to the target device in the second connection. A value of a duration field in the BlockACK message frame is used to indicate a length of time during which it is necessary for the terminal to further occupy the first connection and/or the second connection after receiving the plurality of frames.

After receiving the plurality of frames, it is necessary for the terminal to further encode in the plurality of acknowledgement information, transmit the Block ACK message frame to the target device, and wait for the short inter-frame space. Therefore, the value of the duration field in the Block ACK message frame can be determined according to the length BA of the Block ACK message frame, the length of the plurality of pieces of acknowledgement information, the MCS of the Block ACK message frame and the short inter-frame space SIFS.

Specifically, the value of the duration field in the Block ACK message frame is equal to BA+L0/v+SIFS.

It should be noted that when the first frame includes a plurality of frames, the states of the respective frames to be transmitted in the first connection and the second connection can also be considered.

For example, there is no frame to be transmitted in both the first connection and the second connection, and the value of the duration field in the Block ACK message frame is equal to BA+L0/v+SIFS.

For example, if there are one or more frames to be transmitted in the first connection and/or the second connection, the number of the frames to be transmitted (for example, n) and a total length Ln of the n frames to be transmitted can be determined first; and then the value of the duration field in the Block ACK message frame is equal to Ln+BA+L0/v+n*SIFS.

In some examples, the plurality of pieces of acknowledgement information is included in a bitmap.

In one embodiment, the plurality of pieces of acknowledgement information can be represented by the bitmap.

Corresponding to the aforementioned embodiments of the method for determining the value of the duration field, the present disclosure further provides embodiments of an apparatus for determining a value of a duration field.

In the embodiments of the present disclosure, any one or more of the embodiments shown in FIG. 2, FIG. 3 and FIG. 4 can be used alone or together with the aforementioned embodiment shown in FIG. 5, and the embodiments of the present disclosure are not limited to this.

Figure 6:
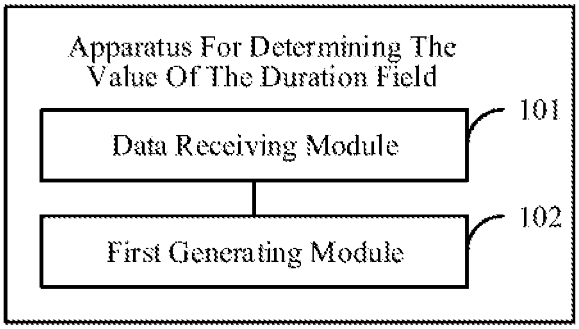
FIG. 6 is a schematic block diagram illustrating an apparatus for determining a value of a duration field according to an embodiment of the present disclosure.

FIG. 6 is a schematic block diagram illustrating an apparatus for determining a value of a duration field according to an embodiment of the present disclosure. The apparatus shown in this embodiment can be applied to a terminal including, but not limited to, an electronic device such as a mobile telephone, a tablet computer, a wearable device, a personal computer, an industrial sensor, and an Internet of Things (IoT) device. The terminal can be used as a station (STA) or an access point (AP).

As shown in FIG. 6, the apparatus for determining the value of the duration field can include:

- a data receiving module 101 configured to receive a first frame transmitted by a target device in a first connection; and
- a first generating module 102 configured to generate an acknowledgement message frame corresponding to the first frame and to be transmitted in a second connection, where in response to the first frame including one frame, a value of a duration field in the acknowledgement message frame corresponding to the first frame is determined according to states of respective frames to be transmitted in the first connection and the second connection.

In some examples, the first generating module 102 is configured to, in response to the fact that there is no frame to be transmitted in both the first connection and the second connection, determine the value of the duration field in the acknowledgement message frame as 0.

In some examples, the first generating module 102 is configured to, in response to that there are one or more frames to be transmitted in either the first connection or the second connection, determining the value of the duration field in the acknowledgement message frame according to a value of a duration field in the first frame, a length of the first frame and a short inter-frame space.

In some examples, the first generating module 102 is configured to, in response to that there is a third frame to be transmitted in the first connection and a fourth frame to be transmitted in the second connection, determining the value of the duration field in the acknowledgement message frame according to a value of a duration field in the first frame, a length of the first frame, a short inter-frame space, a value of a duration field in a second frame received most recently in the second connection, a length of the second frame and a length of the acknowledgement message frame.

In some examples, the acknowledgement message frame further includes one or more preset bits configured to identify the states of the respective frames to be transmitted in the first connection and the second connection.

Figure 7:
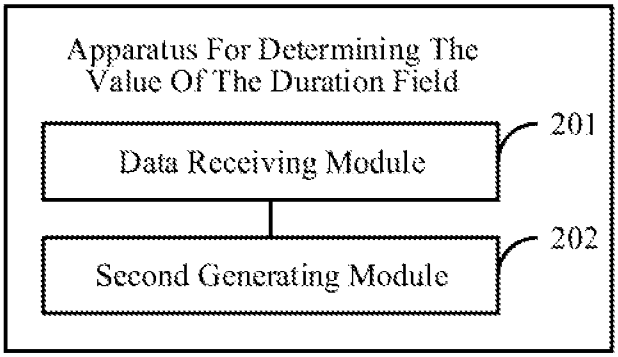
FIG. 7 is a schematic block diagram illustrating another apparatus for determining a value of a duration field according to an embodiment of the present disclosure.

FIG. 7 is a schematic block diagram illustrating an apparatus for determining a value of a duration field according to an embodiment of the present disclosure. As shown in FIG. 7, the apparatus includes:

- a data receiving module 201 configured to receive a first frame transmitted by a target device in a first connection; and
- a second generating module 202 configured to generate a block acknowledgement message frame corresponding to the first frame and to be transmitted in the second connection, where in response to the first frame including a plurality of frames, a value of a duration field in the block acknowledgement message frame is determined according to a length of the block acknowledgement message frame where a plurality of pieces of acknowledgement information corresponding to the plurality of frames are located, a length of the plurality of pieces of acknowledgement information, a modulation and coding scheme of the block acknowledgement message frame and a short inter-frame space.

Regarding the apparatus in the above embodiment, the specific manner in which each module operates has been described in detail in the embodiment of the method, and can be similarly applied to the apparatus that implements the method.

For the apparatus embodiment, since it basically corresponds to the method embodiment, the relevant part may refer to the part of the description of the method embodiment. The apparatus embodiments described above are merely illustrative, where the units described as separate components may or may not be physically separated, and the components displayed as units may or may not be physical units. That is, they may be located in one place or may be distributed to a plurality of network units. Some or all of the modules may be selected according to actual needs, to achieve the objectives of the solutions of the present disclosure. Those skilled in the art may understand and implement without creative labor.

According to the embodiments of the present disclosure, there is provided an electronic device, including:

- a processor; and
- a memory for storing instructions executable by the processor,
- where the processor is configured to implement the method described in any one of the above embodiments.

According to the embodiments of the present disclosure, there is provided a computer readable storage medium storing a computer program, where the computer program, when executed by a processor, causes the processor to implement the steps of the method described in any one of the above embodiments.

Figure 8:
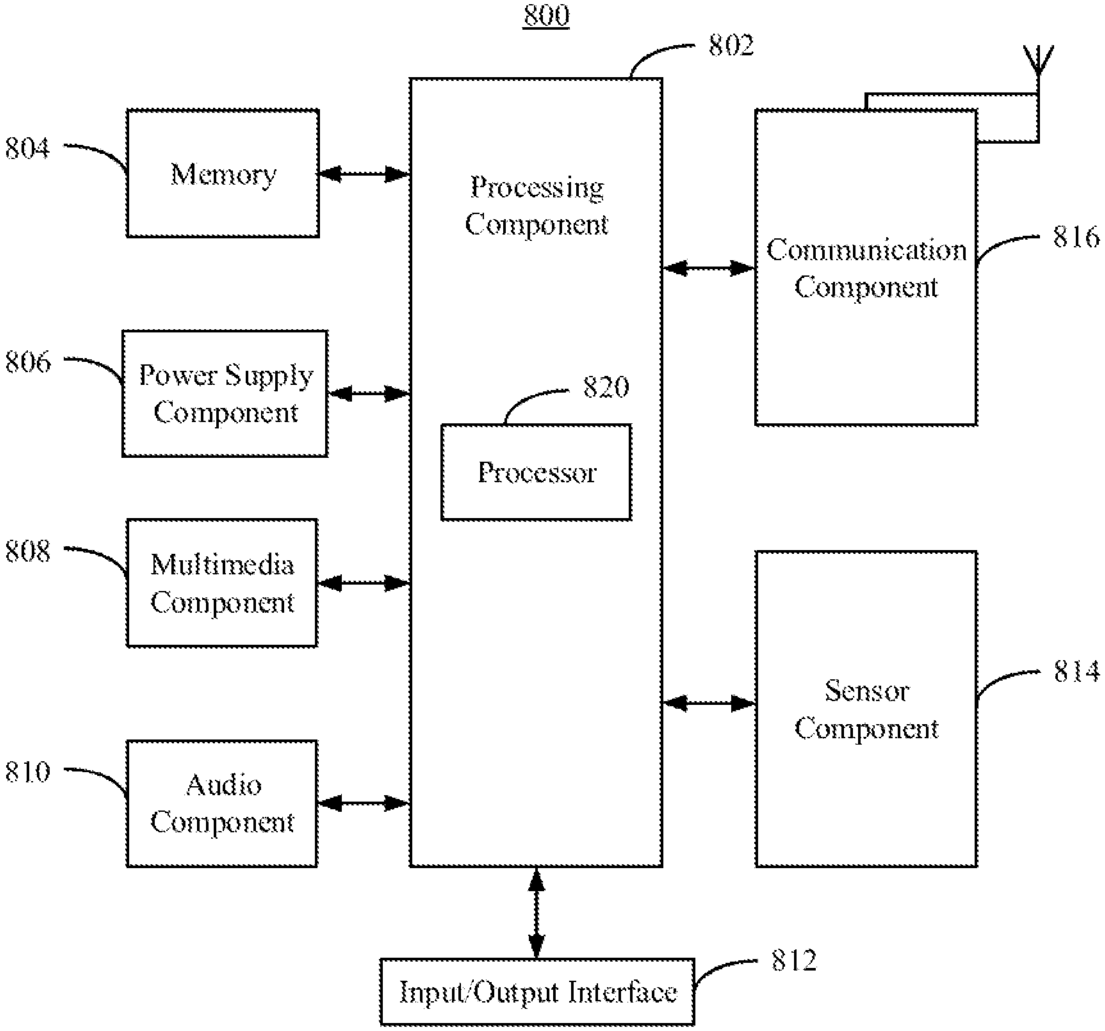
FIG. 8 is a schematic block diagram illustrating an apparatus for determining a value of a duration field according to an embodiment of the present disclosure.

FIG. 8 is a schematic block diagram illustrating an apparatus 800 for determining a value of a duration field according to an embodiment of the present disclosure. For example, the apparatus 800 can be a mobile telephone, a computer, a digital broadcasting terminal, a message receiving and transmitting device, a game console, a tablet device, a medical device, a fitness device, a personal digital assistant, and the like.

Referring to FIG. 8, the apparatus 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls overall operations of the apparatus 800, such as operations associated with display, phone calls, data communications, camera operations, and recording operations. The processing component 802 may include one or more processors 820 to execute instructions to complete all or part of the steps of the above methods. In addition, the processing component 802 may include one or more modules that facilitate the interaction between the processing component 802 and other components. For example, the processing component 802 may include a multimedia module to facilitate the interaction between the multimedia component 808 and the processing component 802.

The memory 804 stores various types of data to support the operation of apparatus 800. Examples of such data include instructions for any application or method operated on the apparatus 800, contact data, phonebook data, messages, pictures, videos, and so on. The memory 804 may be implemented by any type of volatile or non-volatile storage devices or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 806 provides power to different components of the apparatus 800. The power supply component 806 may include a power management system, one or more power supplies, and other components associated with generating, managing, and distributing power for the apparatus 800.

The multimedia component 808 includes a screen providing an output interface between the apparatus 800 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense the duration and a pressure associated with the touch or swipe. In some embodiments, the multimedia component 808 may include a front camera and/or a rear camera. The front camera and/or rear camera may receive external multimedia data when apparatus 800 is in operating mode, such as in photographing or video mode. Each of the front camera and the rear camera may be a fixed optical lens system or have focal length and optical zooming capability.

The audio component 810 is configured to output and/or input an audio signal. For example, the audio component 810 includes a microphone (MIC). When the apparatus 800 is in an operating mode, such as a call mode, a recording mode, and a voice recognition mode, the MIC is to receive an external audio signal. The received audio signal may be further stored in the memory 804 or transmitted via the communication component 816. In some embodiments, the audio component 810 further includes a speaker to output an audio signal.

The I/O interface 812 may provide an interface between the processing component 802 and peripheral interface modules. The above peripheral interface modules may include a keyboard, a click wheel, buttons, and so on. These buttons may include, but are not limited to, a home button, a volume button, a starting button and a locking button.

The sensor component 814 includes one or more sensors to provide status assessments of various aspects for the apparatus 800. For example, the sensor component 814 may detect the on/off status of the apparatus 800, and the relative positioning of the component, for example, the component is a display and a keypad of the apparatus 800. The sensor component 814 may also detect a change in position of the apparatus 800 or a component of the apparatus 800, a presence or absence of the contact between a user and the apparatus 800, an orientation or an acceleration/deceleration of the apparatus 800, and a change in temperature of the apparatus 800. The sensor component 814 may include a proximity sensor to detect the presence of a nearby object without any physical contact. The sensor component 814 may further include an optical sensor, such as a Complementary Metal Oxide Semiconductor (CMOS) or Charge-coupled Device (CCD) image sensor, which is used in imaging applications. In some embodiments, the sensor component 814 may further include an acceleration sensor, a gyroscope sensor, a magnetic sensor, a pressure sensor, or a temperature sensor.

The communication component 816 facilitates wired or wireless communication between apparatus 800 and other devices. The apparatus 800 may access a wireless network that is based on a communication standard, such as Wi-Fi, 2G, or 3G, or a combination thereof. In an embodiment, the communication component 816 receives a broadcast signal or broadcast-associated information from an external broadcast management system via a broadcast channel. In an embodiment, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Blue Tooth (BT) technology and other technologies.

In an embodiment, the apparatus 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above method.

In an embodiment, there is also provided a non-transitory computer readable storage medium including instructions, such as the memory 804 including instructions. The instructions may be executed by the processor 820 of the apparatus 800 to perform the above described methods. For example, the non-transitory computer readable storage medium may be a ROM, a Random Access Memory (RAM), a CD-ROM, a magnetic tape, a floppy disk, an optical data storage device, and the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered exemplary only, with a true scope and spirit of the present disclosure indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relation or order existing between these entities or operations. Also, the terms "including," "containing," or any variation thereof is intended to cover non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded from including additional same elements present in the process, method, article, or device including the elements.

The methods and apparatuses provided by the embodiments of the present disclosure have been described in detail above. Specific examples are used herein to explain the principles and implementations of the present disclosure. The description of the above embodiments is only used to help understand methods and core ideas in the present disclosure. At the same time, those of ordinary skill in the art can apply some changes in the specific implementation and the scope of application based on the idea of the present disclosure. In conclusion, the content of the present specification should not be construed as any limitation to the present disclosure.

The invention claimed is:

1. A method for determining a value of a duration field, performed by a terminal, the method comprising:

receiving a first frame transmitted by a target device in a first connection; and generating an acknowledgement message frame corresponding to the first frame and to be transmitted in a second connection, wherein in response to the first frame comprising one frame, a value of a duration field in the acknowledgement message frame corresponding to the first frame is determined according to states of respective frames to be transmitted in the first connection and the second connection;

wherein the first connection and the second connection are different connections under multi connection communication between the target device and the terminal;

the value of the duration field in the acknowledgement message frame indicates a length of time during which it is necessary for the terminal to occupy at least one of the first connection and the second connection after the acknowledgement message frame is fed back by the terminal to the target device; and the states of the respective frames to be transmitted in the first connection and the second connection comprise: there is no frame to be transmitted in both the first connection and the second connection, or there are one or more frames to be transmitted in one of the first connection and the second connection, or there are one or more frames to be transmitted in both the first connection and the second connection;

wherein in response to that there is no frame to be transmitted in both of the first connection and the second connection, the value of the duration field in the acknowledgement message frame is determined as 0;

in response to that there are one or more frames to be transmitted in one of the first connection and the second connection, the value of the duration field in the acknowledgement message frame is determined according to a value of a duration field in the first frame, a length of the first frame, and a short inter-frame space;

in response to that there are a third frame to be transmitted in the first connection and a fourth frame to be transmitted in the second connection, the value of the duration field in the acknowledgement message frame is determined according to a value of a duration field in the first frame, a length of the first frame, a short inter-frame space, a value of a duration field in a second frame received most recently in the second connection, a length of the second frame, and a length of the acknowledgement message frame.

2. The method according to claim 1, wherein the acknowledgement message frame further comprises one or more preset bits configured to identify the states of the respective frames to be transmitted in the first connection and the second connection.

3. The method according to claim 1, wherein generating the acknowledgement message frame corresponding to the first frame and to be transmitted in the second connection comprises:

generating a block acknowledgement message frame corresponding to the first frame and to be transmitted in the second connection, wherein in response to the first frame including a plurality of frames, a value of a duration field in the block acknowledgement message frame is determined according to a length of the block acknowledgement message frame where a plurality of pieces of acknowledgement information corresponding to the plurality of frames are located, a length of the plurality of pieces of acknowledgement information, a modulation and coding scheme of the block acknowledgement message frame and a short inter-frame space.

4. The method according to claim 3, wherein the plurality of pieces of acknowledgement information are comprised in a bitmap.

5. An electronic device, comprising:

a processor; and a memory for storing instructions executable by the processor, wherein the processor is configured to:

receive a first frame transmitted by a target device in a first connection; and generate an acknowledgement message frame corresponding to the first frame and to be transmitted in a second connection, wherein in response to the first frame comprising one frame, a value of a duration field in the acknowledgement message frame corresponding to the first frame is determined according to states of respective frames to be transmitted in the first connection and the second connection;

wherein the first connection and the second connection are different connections under multi connection communication between the target device and the electronic device;

the value of the duration field in the acknowledgement message frame indicates a length of time during which it is necessary for the electronic device to occupy at least one of the first connection and the second connection after the acknowledgement message frame is fed back by the electronic device to the target device; and the states of the respective frames to be transmitted in the first connection and the second connection comprise: there is no frame to be transmitted in both the first connection and the second connection, or there are one or more frames to be transmitted in one of the first connection and the second connection, or there are one or more frames to be transmitted in both the first connection and the second connection;

wherein in response to that there is no frame to be transmitted in both of the first connection and the second connection, the value of the duration field in the acknowledgement message frame is determined as 0;

in response to that there are one or more frames to be transmitted in one of the first connection and the second connection, the value of the duration field in the acknowledgement message frame is determined according to a value of a duration field in the first frame, a length of the first frame, and a short inter-frame space;

in response to that there are a third frame to be transmitted in the first connection and a fourth frame to be transmitted in the second connection, the value of the duration field in the acknowledgement message frame is determined according to a value of a duration field in the first frame, a length of the first frame, a short inter-frame space, a value of a duration field in a second frame received most recently in the second connection, a length of the second frame, and a length of the acknowledgement message frame.

6. The electronic device according to claim 5, wherein the acknowledgement message frame further comprises one or more preset bits configured to identify the states of the respective frames to be transmitted in the first connection and the second connection.

7. The electronic device according to claim 5, wherein the processor is further configured to:

generate a block acknowledgement message frame corresponding to the first frame and to be transmitted in the second connection, wherein in response to the first frame including a plurality of frames, a value of a duration field in the block acknowledgement message frame is determined according to a length of the block acknowledgement message frame where a plurality of pieces of acknowledgement information corresponding to the plurality of frames are located, a length of the plurality of pieces of acknowledgement information, a modulation and coding scheme of the block acknowledgement message frame and a short inter-frame space.

8. The electronic device according to claim 7, wherein the plurality of pieces of acknowledgement information are comprised in a bitmap.

9. A non-transitory computer readable storage medium storing a computer program, wherein the computer program, when executed by a processor, causes a terminal comprising the processor to execute a method comprising:

receiving a first frame transmitted by a target device in a first connection; and generating an acknowledgement message frame corresponding to the first frame and to be transmitted in a second connection, wherein in response to the first frame comprising one frame, a value of a duration field in the acknowledgement message frame corresponding to the first frame is determined according to states of respective frames to be transmitted in the first connection and the second connection;

wherein the first connection and the second connection are different connections under multi connection communication between the target device and the terminal;

the value of the duration field in the acknowledgement message frame indicates a length of time during which it is necessary for the terminal to occupy at least one of the first connection and the second connection after the acknowledgement message frame is fed back by the terminal to the target device; and the states of the respective frames to be transmitted in the first connection and the second connection comprise: there is no frame to be transmitted in both the first connection and the second connection, or there are one or more frames to be transmitted in one of the first connection and the second connection, or there are one or more frames to be transmitted in both the first connection and the second connection;

wherein in response to that there is no frame to be transmitted in both of the first connection and the second connection, the value of the duration field in the acknowledgement message frame is determined as 0;

in response to that there are one or more frames to be transmitted in one of the first connection and the second connection, the value of the duration field in the acknowledgement message frame is determined according to a value of a duration field in the first frame, a length of the first frame, and a short inter-frame space;

in response to that there are a third frame to be transmitted in the first connection and a fourth frame to be transmitted in the second connection, the value of the duration field in the acknowledgement message frame is determined according to a value of a duration field in the first frame, a length of the first frame, a short inter-frame space, a value of a duration field in a second frame received most recently in the second connection, a length of the second frame, and a length of the acknowledgement message frame.

10. The non-transitory computer readable storage medium according to claim 9, wherein the acknowledgement message frame further comprises one or more preset bits configured to identify the states of the respective frames to be transmitted in the first connection and the second connection.

11. The non-transitory computer readable storage medium according to claim 9, wherein the method further comprises:

generating a block acknowledgement message frame corresponding to the first frame and to be transmitted in the second connection, wherein in response to the first frame including a plurality of frames, a value of a duration field in the block acknowledgement message frame is determined according to a length of the block acknowledgement message frame where a plurality of pieces of acknowledgement information corresponding to the plurality of frames are located, a length of the plurality of pieces of acknowledgement information, a modulation and coding scheme of the block acknowledgement message frame and a short inter-frame space, and the plurality of pieces of acknowledgement information are comprised in a bitmap.

* * * * *